United States Patent [19]

Boetto et al.

[11] 4,151,886
[45] May 1, 1979

[54] MULTI-SECTION FOLDING TOOL BAR FOR AGRICULTURAL IMPLEMENTS

[75] Inventors: Charles Boetto, Naperville; John F. Stufflebeam, Romeoville, both of Ill.

[73] Assignee: International Harvester Company, Chicago, Ill.

[21] Appl. No.: 861,240

[22] Filed: Dec. 16, 1977

[51] Int. Cl.² ............................................. A01B 73/00
[52] U.S. Cl. ..................................... 172/311; 172/456
[58] Field of Search ............... 172/126, 128, 130, 311, 172/456, 491, 580, 581, 583, 586, 650, 662; 56/228, 385; 280/411 R, 411 A, 412, 413, 634, 656

[56] References Cited

U.S. PATENT DOCUMENTS

| | | | |
|---|---|---|---|
| 3,581,993 | 6/1971 | Reams | 239/167 |
| 3,844,358 | 10/1974 | Shuler et al. | 172/311 |
| 3,941,194 | 3/1976 | Orthman | 172/311 |
| 4,020,991 | 5/1977 | Dreyer | 239/167 X |
| 4,030,551 | 6/1977 | Boetto et al. | 172/126 |
| 4,046,203 | 9/1977 | Ward | 172/456 |
| 4,074,766 | 2/1978 | Orthman | 172/311 |

Primary Examiner—Richard T. Stouffer

Attorney, Agent, or Firm—James J. Getchius; Neal C. Johnson; F. David AuBuchon

[57] ABSTRACT

A folding sectional tool bar for agricultural implements and including a series of articulated hollow sections connected together in end-to-end fashion so as to provide an inner main-section, a pair of outer sections, and a pair of intermediate sections. An offset hinge joint between each outer section and its adjacent intermediate section permits them to be latched in an aligned working arrangement and allows generally horizontal folding of the outer sections forwardly relative to the adjacent intermediate sections. An offset hinge joint between each intermediate section and its adjacent main section permits the intermediate sections to float down about 5° relative to the main section and allows vertical folding of the intermediate sections relative to such main section. Hydraulic two-stage cylinders are provided whereby an initial partial fold of 5° intermediate sections can elevate them relative to the inner main section to an angle of about 5° in order to withdraw such earth-working tools as may be carried by the outer sections from ground contact. The entire tool bar can then be raised by the tractor hitch and if it is desired to fold the tool bar it is followed by full effective forward folding of the outer sections.

3 Claims, 6 Drawing Figures

FIG. 6

MULTI-SECTION FOLDING TOOL BAR FOR AGRICULTURAL IMPLEMENTS

The present invention relates to farm implements of the ground working or cultivating type and has particular reference to implements which employ folding sectional tool bars hingedly connected together in end-to-end fashion and on which various types of agricultural tools may be installed, the tool bar sections, when extended to an operative condition of substantial alignment, affording a relatively wide transverse structure. Farm implements such as this with their wide sectional tool bar assemblies possess certain limitations, principle among which is the fact that the implement as a whole is too wide to pass through a gate, between buildings or trees, or to be transported along a road or highway between various field sites, most states having regulations as to the dimensions of implements which are designed for road travel.

Accordingly, it has been long the practice to provide implements having a main or central tool bar section together with outer tool bar sections which are commonly referred to as wing sections, or simply wings, which are hingedly connected in end-to-end fashion to the opposite ends of the main section and to make provision for swinging such wings upwardly in vertical planes and securing them in their upward position when the implement is to be transported or stored. The use of this particular form of articulated sectional tool bar structure, although it does materially reduce the overall width of the implement for transport purposes, presents other problems of a serious nature, principal among which is the fact that when the wing sections are swung to their upright positions for width reduction purposes, they add substantially to the overall height of the implement and thus afford interference with underpasses, overhead power lines or tree limbs. Another problem incident to the use of such vertically folding wing sections resides in the difficulty which is encountered from an engineering standpoint in attaining hinge joints where the folds are capable of going beyond 90° to reduce maximum height, and provide a more stable folded implement.

In an effort to overcome the above-noted height limitation that is attendant upon the construction and the use of folding sectional articulated tool bar assemblies, it has been proposed that a multiplicity of relatively short tool bar sections be provided at each end of the main tool bar section, for example two or three such sections, thereby resulting in a sectional tool bar having a total of five or seven sections in which all of the folding sections swing in the same vertical plane so that the opposite ends of the assembly may be folded innwardly over the main central section roughly in involute fashion. In this manner considerable height reduction is made possible but, since tool bars of this character lie directly behind the pulling vehicle or tractor when they assume such "curled" folded condition, they obstruct the rear vision of the operator of the tractor through the rear window of the operator's cab. A folding tool bar of this general type is shown and described in U.S. Pat. No. 3,844,358, granted on Oct. 24, 1974 and entitled "Folding System for Multi-sectional Implement."

Another limitation that is present in connection with such multi-section tool bars is predicated upon the fact that with relatively massive implements which have an extremely wide lateral spread engineering exigencies dictate that the tool bar sections be of hollow construction in the interests of lightness, as well as of strength, if proper cross sectional area is to be maintained for ease of tool attachment purposes. If folding operations between adjacent tool bar sections to exceed 90° to produce the desired inward involute arrangement of section at each end of the main tool bar, it has been considered necessary to utilize an external hydraulic ram to actuate each hinge joint and the use of a large multiplicity of such external rams, together with various hose connections leading thereto, still further reduces rearward visibility.

It has been proposed that with tool bar sections that are not connected in end-to-end relationship, in order to reduce the overall height of the implement, as well as the overall width thereof, provision be made for swinging an outer tool bar section in a forward direction about its midpoint so that it extends parallel to the line of travel of the implement and thereafter causing the pivot point for such outer section to be swung inwardly and upwardly throughout an angle slightly in excess of 90°, this expedient also causing a reduction in the overall width and height of the implement. A folding tool bar of this general character is shown and described in U.S. Pat. No. 3,830,313, granted on Aug. 20, 1974 and entitled "Folding Disk Harrow." However, since the center of gravity of the outer tool bar section coincides with its hinge point, substantially the same lifting power must be exerted when the vertical lifting force is applied thereto, whether the lifting force be applied before the outer section is turned forwardly or after it is turned forwardly. This lifting force is therefore relatively great in either instance. Furthermore, in an implement of this type, adjacent tool bar sections cannot be said to be connected together in end-to-end fashion.

The present invention is designed as an improvement over present day tool bar assemblies which rely for both their width and height reduction upon the use of outer tool bar sections which may be folded forwardly so that they extend in the direction of implement travel and, toward this end, the invention contemplates the provision of a tool bar assembly which is comprised of a main central tool bar section, a pair of outer tool bar sections, and a pair of intermediate tool bar sections which are disposed between the outer sections and the main section, the entire series of tool bar sections being connected together in end-to-end fashion by offset hinge arrangements. All of the tool bar sections are of hollow tubular construction and the hydraulic power means for actuating the hinge joints comprises cylinder and plunger arrangements which are enclosed with the hollow tool bars and are thus concealed. The two inner hinge joints between the main section and the intermediate section embody hinge pins which extend horizontally so that the intermediate sections may fold vertically upwardly, while the two outer hinge joints between the outer tool bar sections and the intermediate sections include latching mechanism for latching the outer sections in aligned relationship to the associated inner section and embody hinge pins which extend vertically so that the outer tool bar sections may fold forwardly relative to the intermediate sections. Each hinge joint includes an articulated linkage system which enables the hinge joint to operate in excess of 90° and thus bring the associated tool bar sections into acute angular relationship at an angle on the order of 130°. Hydraulic means are provided under the control of suitable valve structures disposed in the operator's cab of the motivating tractor for actuating the cylinders for the various hinge joints in timed relationship relative to one another, the timing of hinge joint operation constituting one of the principal features of the invention. In the free extended earth-working condition of the tool bar assembly, inner hinges permit a down float of about 5° so that the intermediate and outer tool bar sections may follow an undulatory ground pattern. When it is desired to fold the tool bar assembly it is preferable that the extreme outer sections be folded horizontally forwardly before the intermediate sections are folded vertically upwardly to any great extent in order that the center of gravity of these outer sections may be shifted inwardly and thus reduce the power that is required to raise the intermediate sections. However, before such forward folding can be effected with ease, it is necessary to overcome the 5° down float so that any tools which may be carried on the outer sections be raised from contact with the soil. In order to accomplish this, power is applied to the two inner offset hinge joints in such a manner as to swing the intermediate tool bar sections upwardly to a very slight degree relative to the main section to an angle on the order of 5°. While this may not withdraw the tools associated with such intermediate sections out of the ground, the 5° angle is adequate to lift the outer sections so that their tools completely disengage the ground and leave the outer sections free to be swung forwardly with but little effort. This 5° lifting of the inner joints is also used during field operations to prevent the ends from drooping when turning at the end of each field pass. It should be understood that after the inner joints have been raised the 5° the entire tool bar is raised by the tractor hitch, to thus free all ground working tools. If at this stage it is desired to fold the tool bar, power is applied to the two outer hinge joints and such forward swinging of the outer sections is effected, the swinging angle involved being on the order of 135° so that the centers of gravity of these outer sections are brought appreciably inwardly toward the center of the tool bar as a whole. Upon completion of such forward swinging motion of the outer tool bar sections, power is again applied to the two inner offset hinge joints and upward swinging movement of the intermediate tool bar sections is resumed, this time with an appreciably lower load factor, and the swinging angle involved is also on the order of 135°, the net result being that complete effective folding of the tool bar assembly is completed with the intermediate tool bar sections assuming over-center inwardly inclined positions and the outer tool bar sections assuming similar overcenter positions wherein they are inclined forwardly and downwardly alongside the operator's cab on opposite sides thereof in out-of-the-way positions wherein they do do not project appreciably, if at all, above the level of the roof of the operator's cab and where they present no obstruction to rearward vision of the operator through the rear window of the cab. The hydraulic means for thus actuating the various hinge joints may vary widely but in the illustrated form of the invention this means is semi-automatic in that two manually operable control valves are disposed in the operator's cab, one of these valves having three operative positions and the other having four operative positions. Each valve has a neutral work and fold position. The four position valve also has an unfold position. When both valves are in the work position all of the tool bar sections are in their extended working positions and are free floating so that they may follow the contour of an undulatory terrain.

The fold position of the three-position valve causes the inner hinge joints to be actuated to raise the intermediate tool bar sections throughout a small angle on the order of 5° to thus elevate the outer tool bar section. The fold position of the four position valve causes the outer hinge joints to be actuated to effect forward folding of the outer tool bar sections, after which it automatically causes the inner hinge joints to be actuated to fully raise the intermediate tool bar sections with the forwardly folded outer sections thereon, thus completing the tool bar folding operations. This sequencing is a result of the oil taking the path of least resistance to fold the outer sections first.

The unfold position of the four-position valve causes the inner hinge joints to be actuated to lower the intermediate section with the folded outer sections thereon back to their slightly raised 5° position, after which it automatically causes the outer hinge joints to be actuated to unfold the outer tool bar sections thus extend them at which point they automatically latch in the extended position. Then, by shifting both valves to their work positions, all hinge joints are relieved of actuating pressure and the inner joints are restored to their free floating earth working conditions.

The desired sequencing of the unfolding operation is attained by the interposition of a pair of fluid dampening restriction orifices in certain of the fluid lines leading from the four position valve to the cylinders which control the operation of the hinge joint actuating cylinders. Another pair of restricting orifices are disposed in certain other fluid lines leading from the four-position control valve functions during tool bar unfolding operations to prevent too rapid a conduction of fluid to the cylinders as they perform their unfolding operations so that the unfolding functions are performed without impact or other shock.

The provision of a multi-section folding tool bar such as has briefly been outlined above constitutes the principal object to the present invention. Numerous other objects and advantages of the invention, not at this time enumerated, will readily suggest themselves as the nature of the invention is better understood.

In the accompanying three sheets of drawings forming a part of this specification, one illustrative embodiment of the invention has been shown.

In these drawings.

Figures 1, 2:
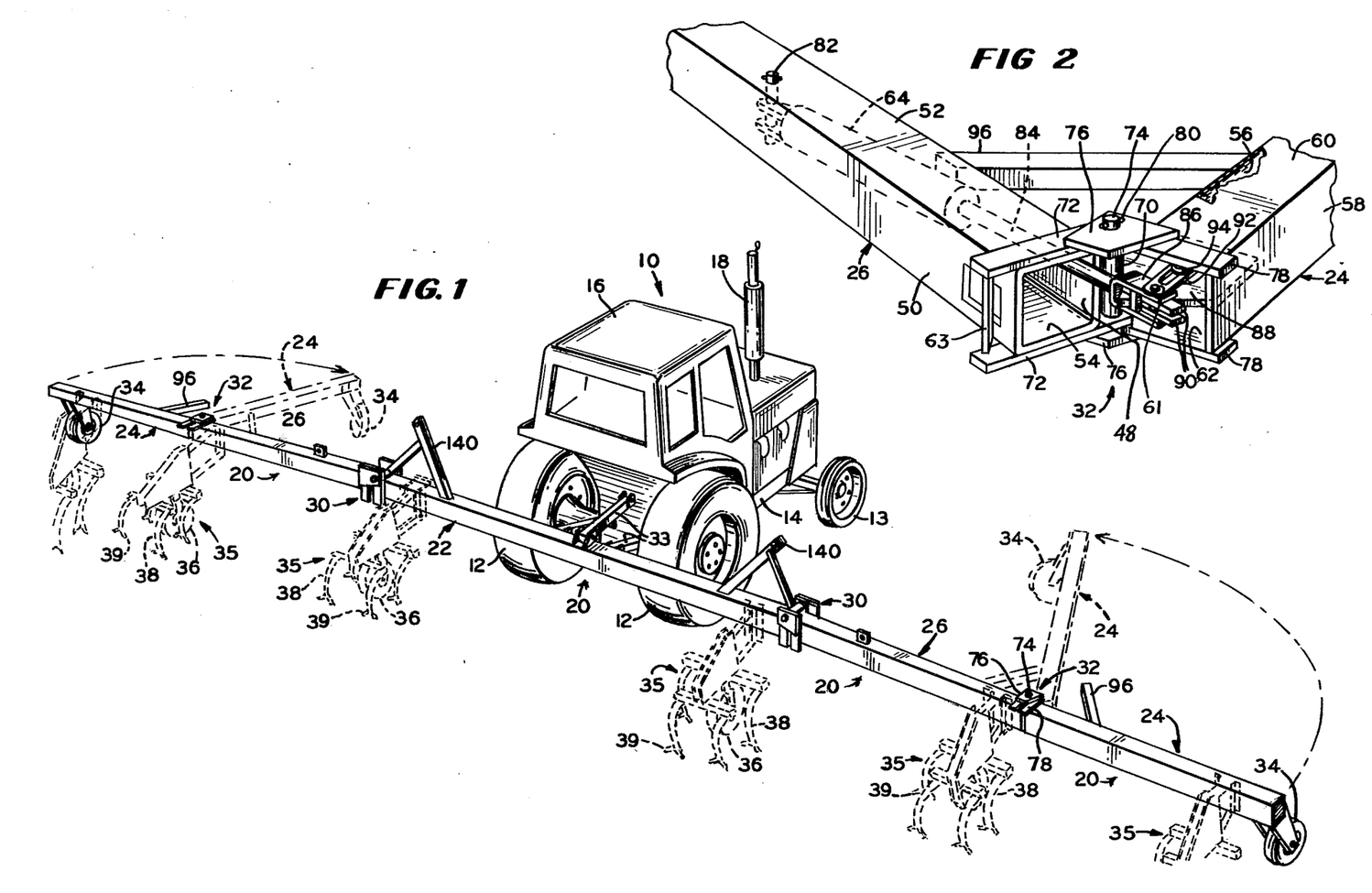
FIG. 1 is a rear perspective view, largely schematic in its representation, of a farm implement embodying the improved sectional folding tool bar of the present invention and showing the same in its fully extended operative position.
FIG. 2 is an enlarged fragmentary detail perspective view taken in the vicinity of one of the two outer hinge joints of the folding tool bar and showing the adjacent outer tool bar section in its effective fully and forwardly folded position relative to its associated intermediate tool bar section.

Referring now to the drawings in detail, and in particular to FIG. 1, a mobile agricultural tractor having the novel folding tool bar of the present invention mounted thereon, is designated in its entirety by the reference numeral 10, such tractor being generally of conventional construction and embodying the usual traction driving wheels 12, dirigible steering wheels 13, chassis or frame 14, operator's cab 16, engine exhaust stack 18, three point hitch 33 and other tractor adjuncts which bear no direct relation to the present invention and which, therefore, have not been disclosed herein.

Operatively mounted at the rear end of the tractor 10 and suitably supported from the tractor frame 14 by the three point hitch 33 is a transversely extending folding tool bar assembly 20 which is constructed according to the present invention and which consists of a fixed main or central inner tool bar section 22, a pair of outer tool bar sections 24, and a pair of intermediate tool bar sections 26, the latter being disposed between the main tool bar section and their respective outer tool bar sections 24.

Each of the intermediate tool bar sections 26 is connected to the central or main fixed tool bar section 22 by a power-actuated first offset hinge joint 30 which allows the section 26 to fold upwardly in a vertical plane relative to the main tool bar section 22, while each of the outer tool bar sections is connected to the adjacent intermediate tool bar section 26 by a similar power-actuated second offset hinge joint 32 which allows the section 24 to fold forwardly in an approximately horizontal plane relative to such intermediate section, all in a manner and for a purpose that will be set forth in detail presently. The main central tool bar section 22 is adapted to be fixedly mounted on the rear end of the tractor-like implement chassis 14 by means of conventional three point hitch connections 33 while the outer tool bar sections 24 may be provided with the usual gauge wheels 34. It should be noted that the first and second hinge joints 30 and 32 extend at an angle of 90° to each other. The axes of joints 30 and 32 could of course be orientated differently than shown in the preferred embodiment or the outer sections could fold rearwardly.

In FIG. 1, the tool bar is shown in its extended or ground-working condition wherein all of the various tool bar sections 22, 24 and 26 are substantially in horizontal alignment, this being the free state of the tool bar assembly 20. In this extended or ground working condition the hinge joints 32 are latched to thus prevent movement of the outer sections 24 relative to the intermediate sections 26 and the hinge joints 30 will permit the intermediate sections 26 to pivot down about 5° below alignment with the main section 22. Generally speaking, tool bar folding operations may be accomplished by causing the two outer tool bar sections 24 to be unlatched and swung or folded forwardly about the hinge joints 32 as indicated by the broken line arrows in FIG. 1 throughout angles on the order of 135° wherein such sections swing generally in a horizontal plane.

Figures 3, 4, 5:
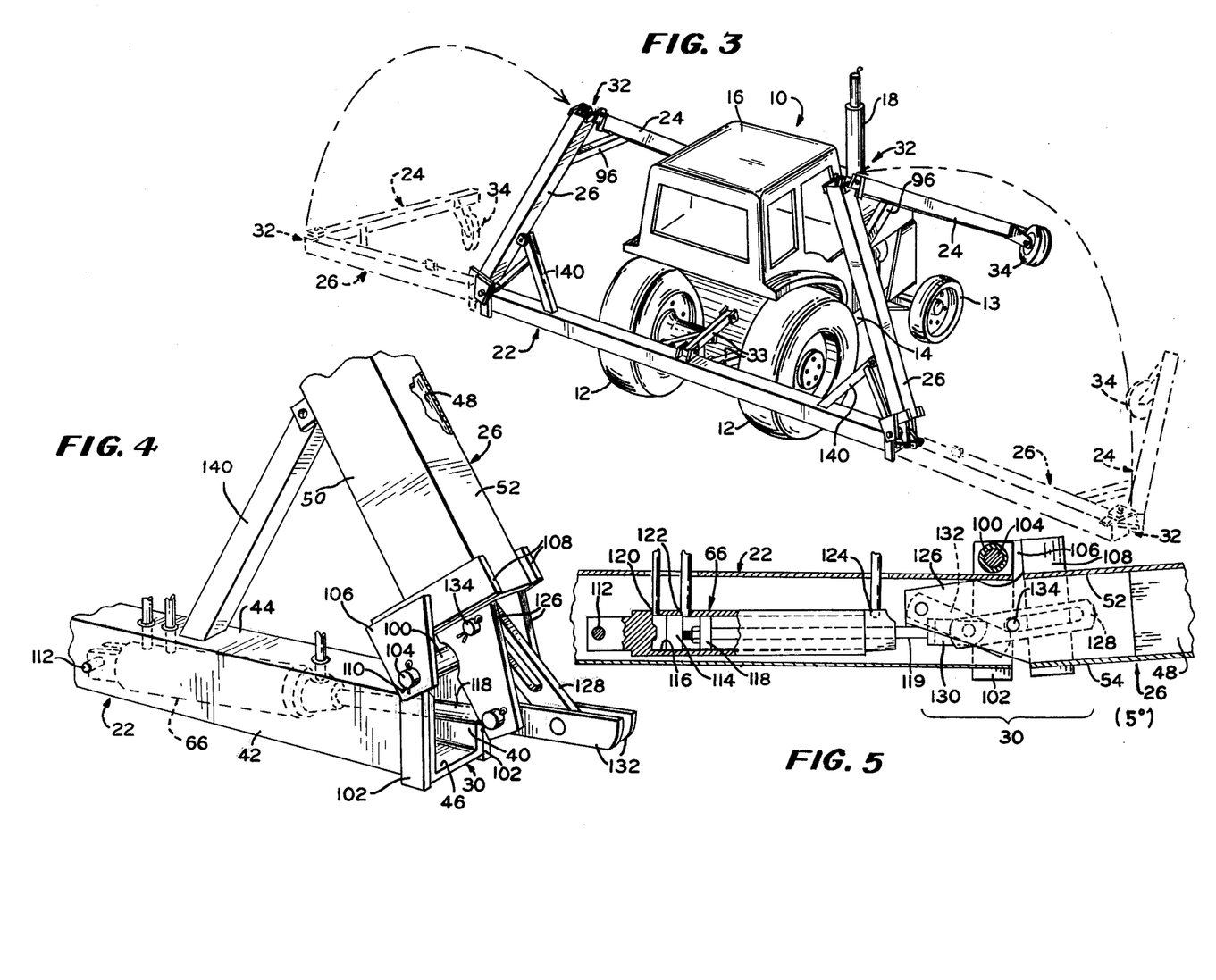
FIG. 3 is a rear perspective view, similar to FIG. 1, showing the tool bar in its effective fully folded position.
FIG. 4 is an enlarged fragmentary detail perspective view taken in the vicinity of one of the two inner hinge joints of the folding tool bar and showing the adjacent intermediate tool bar section in its effective fully folded position relative to the main or central tool bar section.
FIG. 5 is a fragmentary longitudinal sectional view of the folding tool bar taken in the vicinity of one of the inner hinge joints, showing the two-stage hinge-actuating cylinder and its associated linkage mechanism largely in elevation, and with the cylinder at the completion of its first stage of operation so as to maintain the adjacent tool bar section partially elevated.
Figure 6:
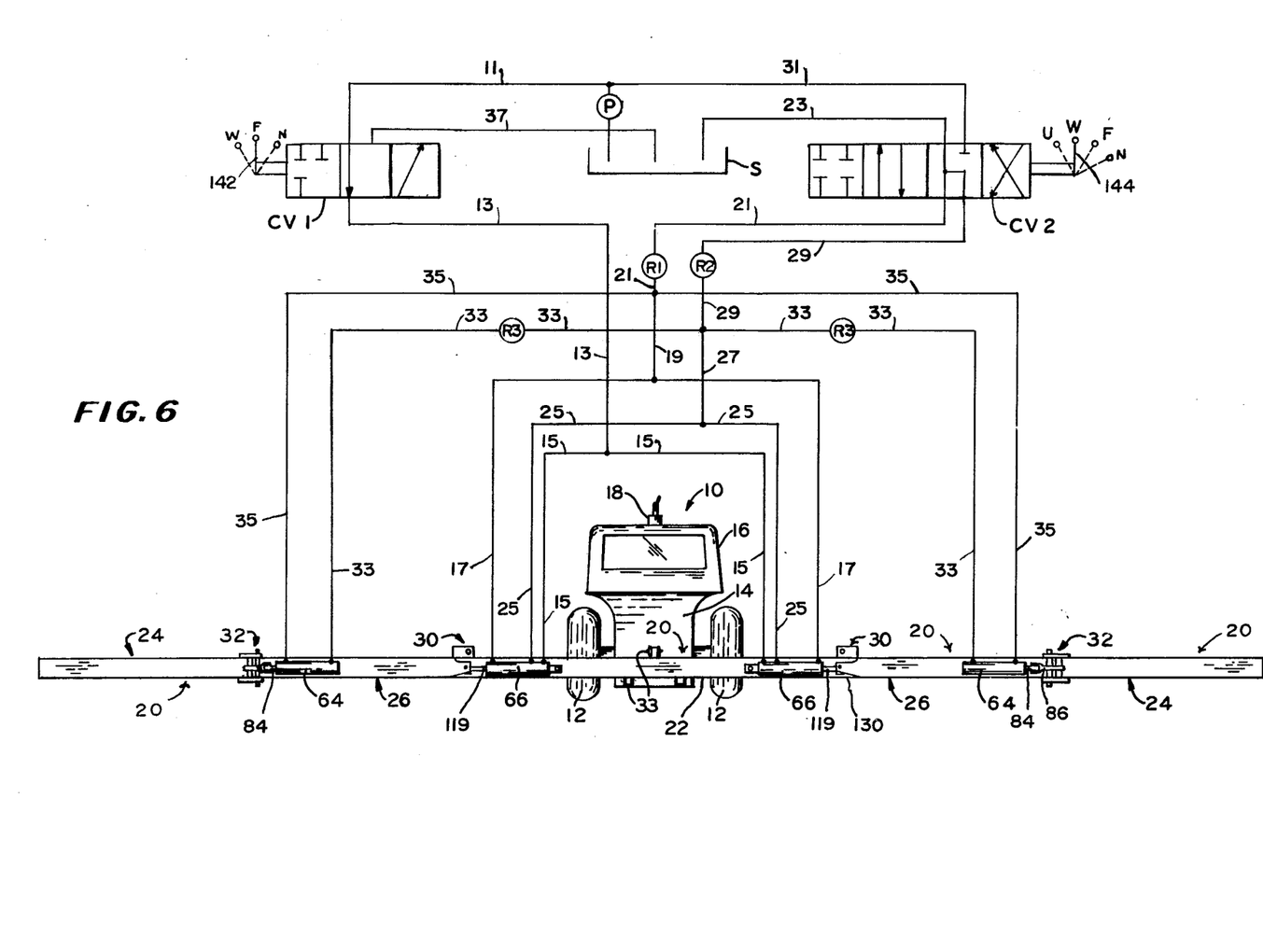
FIG. 6 is a hydraulic circuit diagram, illustrating the operation of the folding tool bar assembly.

Thereafter, the intermediate sections 26 may be swung or folded upwardly about the hinge joints 30 throughout angles on the order of 135° with the tool bar sections 24 remaining folded as indicated by the broken line arrows in FIG. 3. In actual practice however, when the implement is operating in the field, before the initial folding operations of the outer tool bar sections 24 is effected, it is desirable that the intermediate tool bar sections 26 be elevated from their horizontal or slightly below horizontal positions to a small angle, as for example on the order of 5° as illustrated in FIG. 5 in order to raise the various tool assemblies which may be carried by such outer tool bar sections from the ground and then raise the entire tool bar with the tractor three point hitch 33 to thus afford clearance of such assemblies and consequent ease of forward shifting movement of the outer tool bar sections. It will be understood therefore that the disclosures of FIGS. 1 to 4 inclusive are illustrative only of the possible mechanical folding movements of which the various tool bar sections 22, 24 and 26 are capable, one upon another, whereas FIGS. 5 and 6 are illustrative of certain sequential partial folding operations that are resorted to in actual practice when the implement is folded in the field under actual operating conditions.

The various tool bar sections 22, 24 and 26 may carry a wide variety of ground working tools, the character of which is appropriate with the desired type of agricultural implement. The particular implement selected herein as an environment for the present invention is in the form of a cultivator and thus the tool bar sections 22, 24 and 26 are shown as serving to operatively support a series of cultivator units which are shown in dotted lines in FIG. 1 and designated in their entirety by the reference numeral 35. These assemblies embody the usual gauge wheels 36 together with chisel teeth 38 having sweeps 39 thereon. It is to be distinctly understood that for other types of agricultural implements, a wide variety of ground-working tools are available for use in connection with the tool bar sections among these being cultivator disks, shovels, planter units, subsoil plows, middlebusters and other tools too numerous to mention. Irrespective however of the particular tool assemblies which may be associated with the various tool bar sections, the essential features of the invention remain undisturbed.

All of the tool bar sections 22, 24 and 26 are of hollow tubular construction. As best shown in FIG. 4, the main tool bar section 22 includes vertical front and rear walls 40 and 42, a horizontal top wall 44 and a horizontal bottom wall 46. As best shown in FIG. 2, each intermediate tool bar 26 includes front and rear walls 48 and 50, a normally horizontal top wall 52 and a normally horizontal bottom wall 54. Each outer tool bar section 24 includes front and rear walls 56 and 58, and top and bottom walls 60 and 62.

Considering now the various power-actuated hinge joints between adjacent tool bar sections, the specific hinge joints per se, i.e. the character thereof, form no part of the present invention and no novelty is attributed thereto except insofar as they are arranged in the tool bar assembly so that forward folding of the outer tool bar sections 24 may take place as previously indicated. As will be described in greater detail subsequently, the hinge joints 32 which exist between the outer tool bar sections 24 and their adjacent intermediate tool bar sections 26 are actuated under the control of hydraulic cylinders 64 (see particularly FIG. 2) which, when fluid is supplied thereto, function in a single stage manner to unlatch these joints and attain complete effective forward folding of the wings 24 in the generally horizontal plane of the tool bar sections 26. On the other hand, the hinge joints 30 which exist between the intermediate tool bar sections 26 and the central or main fixed tool bar section 22 are actuated under the control of hydraulic cylinders 66 (FIGS. 4 and 5) which, when fluid is supplied thereto in a selective manner, function by a dual stage operation, first to apply small increments of folding motion to the tool bar sections 26 in the vertical plane of the tool bar section 22, and thereafter to complete the effective vertical folding of such tool bar sections 26 upon the tool bar section 22, all in manner for a purpose that will be made clear presently.

Each of the single stage power-actuated offset hinge joints 32 for the outer tool bar sections 24 is preferably, but not necessarily of the general type shown and described in U.S. Pat. No. 4,046,203, issued on Sept. 6, 1977 and entitled "Folding Tool Bar for Agricultural Implements." Such a hinge joint is disclosed herein in FIG. 2 in sufficient detail that its operation may be ascertained by reference to the brief description thereof which will be set forth presently. However, for a full understanding of the operation of the hinge joint 32, and particularly for an understanding of the manner in which the hydraulic cylinder 64 applies maximum motivating power to the associated tool bar section 24 to exert an initial powerful torque-exerting thrust to the section 24, reference may be had to the aforementioned U.S. Pat. No. 4,046,203, the entire disclosure of which, insofar as it is consistent with the present invention, is hereby incorporated in and made a part of this application.

Briefly, and with reference to FIG. 2, each power-actuated hinge joint 32 embodies a hinge sleeve 70 which extends vertically and alongside the front vertical wall 48 of the adjacent intermediate tool bar section 26 and is fixedly mounted on such section by means of a pair of reinforcing plates 72 which are welded to the top and bottom walls 52 and 54 and have their forward ends welded to the opposite ends of the sleeve 70. A hinge pin or shaft 74 projects through the hinge sleeve 70 so as to provide trunnion-like ends which receive thereover a pair of side plate 76 which are welded to reinforcing plates 78 similar to the plates 72 and which, in turn, are welded to the top and bottom walls 60 and 62 of the outer wing section 24 at the extreme proximate or inner end thereof. Lock pins 80 hold the hinge pin 74 in position. The side plates 76 are so dimensioned that they provide the necessary offset for the hinge joint in order that when the tool bar section 24 and intermediate tool bar section 26 are in their aligned position, the adjacent open ends thereof mate with each other as shown in FIG. 1.

The aforementioned hydraulic cylinder 64 by means of which the hinge joint 32 is actuated is disposed wholly within the tool bar section 26 and is thus concealed therein. The inner end of the cylinder 64 is pivoted on a pin 82 which extends between the top and bottom walls 52 and 54 so that the cylinder is capable of limited swinging movement within the tool bar. A piston-connected plunger 84 projects outwardly of the cylinder 64 and carries a yoke 86 at its extreme outer end. Hydraulic fluid lines extend to the opposite ends of the cylinder 64, such lines being omitted in FIGS. 1, 2 and 3 but appearing in schematic fashion in FIG. 6.

In order to translate the in and out movements of the plunger 84 into swinging movements of the outer tool bar section 24, an articulated linkage system substantially identical with the articulated system which is shown and described in the aformentioned U.S. Pat. No. 4,046,203 is employed. For a full understanding of such linkage system, reference may be had to such patent and, for purposes of discussion herein it is deemed sufficient to state that the system includes a flat plate-like crank arm 88 which is disposed largely within the tool bar section 24 but which has a portion thereof that extends into the adjacent open end of the tool bar section 26 when the two sections 24 and 26 are in alignment. A combined lever and draw link 90 of the dual link type straddles the crank arm 88, is pivoted to the latter and also by pins 61 to the yoke 86, and a pair of slotted floating links 92. The portion of the dual draw links 90 that extend beyond pins 61 function as latch lugs which cooperate with a latch block 63 that extends inside section 26 to latch outer sections 24 in aligned position relative to the intermediate sections 26 when hydraulic cylinder 64 is fully retracted. When hydraulic cylinder 64 is extended the initial movement of plunger 84 causes the latch lugs to move away from the latch block and free the outer sections 24 to pivot about pins 74. A dual-headed pin 94 carried by the crank arm 88 slidingly projects through the slotted floating links 92. As may readily be ascertained by reference to the aforementioned U.S. Pat. Nos. 4,046,203 at such time as it is desired to move the outer tool bar section 24 from its extended position to its folded position, hydraulic fluid will be applied to the inner end of the cylinder 64 and thus cause the plunger 84 to commence its outward movement. After the initial slight outward projection of the plunger 84 unlatches the outer section 24 from the intermediate section 26 continued outward movement will swing the draw link 90 into engagement with the dual headed pin 94 and apply a relatively high degree of torque to the tool bar section 24, tending to dislodge the same from its fully extended position. Further outward motion of the plunger 84 and yoke 86 causes the pin 94 to move away from the draw link 90 and the latter functions in tension to further motivate the crank arm 88 and move the tool bar section 24 towards its final folded position. When it is desired to unfold the tool bar section 24 and restore it to its fully extended position, fluid will be supplied to the outer end of the hydraulic cylinder 64 and a reversal of the motions of the articulated linkage system as briefly set forth above will take place. The final movement of plunger 84 in this direction causes the latch lugs to move into engagement with latch block 63 to thereby lock outer section 24 into aligned position relative to intermediate section 26.

As shown in FIGS. 1, 2 and 3, limit stops or rest bars 96 are carried by the front walls 56 of the outer tool bar sections 24 and are designed for engagement with the front walls 48 of the intermediate tool bar sections 26 to establish the limit of folding movement of the latter sections.

Referring now to FIGS. 4 and 5, each of the power-actuated dual stage offset hinge joints 30 between the intermediate tool bar sections 26 and their adjacent main tool bar section 22 is preferably, but not necessarily of the general type shown and described in U.S. Pat. No. 4,030,551, issued on June 21, 1977 and entitled "Folding Flex Toolbar." Such a hinge joint is disclosed in FIGS. 4 and 5 herein in sufficient detail that its operation may be ascertained by reference to the brief description thereof which will be set forth presently. However, for a full understanding of the operation of the hinge joint 30, and particularly for an understanding of the manner in which the hydraulic cylinder 66 applies a powerful motivating torque-exerting thrust to the tool bar sections 26 to initially raise it, and also the outer tool bar section 24 carried thereby, for ground clearance purposes as previously outlined, reference may be had to U.S. Pat. No. 4,030,551, the entire disclosure of which, insofar as it is consistent with the present invention, is hereby incorporated in and made a part of this application.

Briefly, and with reference to FIGS. 4 and 5, each power-actuated hinge joint 30 embodies a hinge sleeve 100 which extends horizontally a slight distance above the top wall 44 of the tool bar section 22 and is fixedly mounted on such section by means of a pair of reinforcing plates 102 which are welded to the front and rear walls 40 and 42 and have their upper ends welded to the opposite ends of the sleeve 100. A hinge pin or shaft 104 projects through the hinge sleeve 100 and provides trunnion-like ends which receive thereover a pair of side plates 106. These latter plates 106 are welded to reinforcing plates 108, similar to the plates 102 and which, in turn, are welded to the front and rear walls 48 and 50 of the intermediate section 26 at the inner or proximate end thereof. Lock pins 110 hold the hinge pin 104 in position. In sofar as the pivoting function of the hinge joint 30 is concerned, it is similar to that of the previously described hinge joint 32, the principal difference being that with the hinge joint 30 the hinge sleeve 100 and its associated hinge pin 104 extend horizontally, whereas with the hinge joint 32, the corresponding sleeve and pin extend vertically, the hinge joint 30 does not include the hitching means of hinge joint 32 and hinge joint 30 will permit intermediate section 26 to pivot about 5° below its aligned position with main section 22.

The hydraulic means whereby each of the hinge joints 30 is operated includes a two-stage hydraulic cylinder 66. Such cylinder is operable during its first stage of operation to raise the associated intermediate tool bar section 26, as well as the outer tool bar section 24 carried thereby, from their ground-engaging position to a slightly raised position such as has been shown in FIG. 5. As will be described in greater detail presently, this initial first stage operation of the cylinder 66 keeps the outer ends of the tool bar from dropping because of the built-in 5° down float and insures that after the entire tool bar has been raised by the tractor three-point hitch 33 that the outer ends of the tool bar clear the ground in order that the cylinder 64 for the associated outer tool bar section 24 may then be actuated to fold such outer section forwardly. The cylinder 66 is then actuated throughout its second stage in order to raise the intermediate tool bar section 26 and its now folded outer tool bar section to bring the tool bar sections to the positions in which they are shown in FIG. 3.

As previously stated, the hinge joint 30, together with its hydraulic actuating mechanism including the cylinder 66, is substantially the same as the hinge joint shown and described in U.S. Pat. No. 4,030,551 and therefore a brief description will suffice for an understanding of such hinge joint 30. As shown in FIG. 5, the cylinder 66 has one end pivoted on a horizontal cross-pin 112 which extends between the front and rear walls 40 and 42 of the tool bar section 22 and a floating positive displacement piston 114 is capable of limited sliding movement within a counterbore 116 in the cylinder. A second piston 118, having a smaller diameter than pistons 114, is diposed within the cylinder and is capable of a relative long stroke therein. The piston 118 is secured to a plunger 119. Fluid ports 120 and 122 communicate with the counterbore 116 near the proximate end thereof and a fluid port 124 communicates with the distal end of the cylinder.

The articulated linkage system which is employed for transmitting motion of the plunger 119 to the adjacent intermediate tool bar section 26 is similar in many respects to the previously described articulated linkage of FIG. 2 associated with each of the hinge joints 32 and it functions in a similar manner. One difference between the two linkage mechanisms resides in the fact that whereas the mechanism of FIG. 2 employs a single crank arm 88 and a pair of slotted floating links 92, the mechanism of FIG. 5 utilizes a pair of spaced apart crank arms 126 and a single slotted floating link 128. Another difference is that hinge joints 30 permit section 26 to float down 5° relative to section 22 and do not include the latching mechanism. Otherwise, and including the piston-mounted yoke 130, draw link 132, and abutment pin 134, the structure of the linkage mechanism remains substantially the same, as also does its operation.

It has previously been stated that when beginning the folding sequence, a slight initial folding of the two intermediate tool bar sections 26 vertically upwardly is resorted to in order to offset the built in 5° down float of hinge joints 30. This is accomplished by supplying fluid to the port 120 of each two-stage cylinder 66, thus shifting the positive displacement piston 114 outwardly and also driving the piston 118 and its associated plunger 119 a short distance outwardly to a point where the outer ends of the draw links 132 engage the underneath side of the pin 134 as shown in FIG. 5 and applies torque to the crank arms 126 to such an extent that the intermediate tool bar section 26 is raised to an elevation of approximately 5°. This 5° elevation of the sections 26 is of course accompanied by a raising of the outer tool bar sections 24 which are carried thereby.

This operation of the two-stage cylinder 66 is followed by a lifting of the entire implement by the tractor three-point hitch 33 and then an application of fluid to the inner end of each of the two outer single phase cylinders 64, whereupon unlatching of and forward folding of the outer tool bar wings 24 takes place in the manner previously set forth in detail. After these outer sections have become fully loaded to the extent permitted by the limit stops or rests bars 96, the second stage of operation of the two cylinders 66 is initiated by supplying hydraulic fluid to the cylinders through the ports 122, thereby driving the pistons 188 to the end of their outward strokes and projecting the plungers 119 so that the draw links 132 function under tension to pull the crank arms further from the open ends of the fixed main tool bar section 22 and apply lifting torque to the intermediate tool bar sections 26 while at the same time the pin 134 moves away from the draw link 132. A pair of limit stops or rests bars 140 on the opposite end regions of the fixed main tool bar section 22 determine the fully folded positions of the intermediate tool bar sections.

Unfolding of the tool bar assembly 20 so as to restore the same to its extended earth-working position is accomplished by a substantial reversal of the process briefly outlined above, hydraulic fluid being first introduced to the ports 124 to retract the plungers 119 and thus unfold the two inner offset hinge joints 30. Such unfolding of the hinge joints 30 continues until such time as the intermediate tool bar sections 26 are restored to their positions of 5° elevation, at which time a delayed action flow of fluid to the outer ends of the cylinders 64 causes the plungers 84 to become withdrawn, thus unfolding the outer tool bar sections 24. As soon as such sections 24 assume their extended position, fluid is then permitted to flow from cylinders 66 through ports 120 allowing plungers 119 to complete their retraction strokes, thereby placing the extended tool bar sections 26 and 24 in a floating state which will permit it to float down about hinge joints 32 about 5° below alignment with the main section 22. At this point, the application of fluid to the various cylinders 64 and 66 is discontinued so that the various tool bars may freely follow any ground undulations which may be encountered.

Referring now specifically to the hydraulic diagram of FIG. 6 wherein tool bar folding and unfolding operations are schematically illustrated, a pair of manually operable directional control valves CV1 and CV2, in combination with each other and by selective manipulations thereof, supply hydraulic fluid to the various cylinders 64 and 66 in proper sequence. It should be noted that the tractor three-point hitch 33 is controlled by the conventional tractor hydraulic system.

Control valve CV1 has three working positions and excludes a manipulating handle 142 which is capable of being shifted between a full line fold position labelled F, a dotted line working position labelled W and a second dotted line neutral position labeled N. When handle 142 is in the fold position F fluid is supplied to the first stage of the two-stage cylinders 66 for the purpose of raising the intermediate and outer sections 26 and 24 to their 5° elevated position, in working position W fluid from the first stage of cylinder 66 can drain out to relax the intermediate and outer sections 26 and 24 permitting them to float. In position N or fluid flows through control valve CV1 and is used to hold the intermediate and outer sections 26 and 24 in the 5° elevated position.

The control valve CV2 has four working positions and it is provided with a manipulating handle 144 which is movable from a full line position labeled W or dotted line position N, F or U. The W position signifies a "working" position at which the combined tool bars 24 and 26 are free to float about hinge joints 30. The position F signifies a folding position wherein generally horizontal forward folding of the partially raised tool bar sections 24 takes place under the control of the cylinders 64, after which an upward folding of the intermediate tool bar sections 26 takes place under the control of the second stage of operation of the cylinders 66. The position U signifies an unfolding position wherein the tool bar sections 26 with the sections 24 forwardly folded thereon, are restored to their 5° raised positions of elevation and thereafter the tool bar sections 24 are unfolded relative to the sections 26. The N position signifies a neutral position at which there is no fluid flow through valve CV2. The N position could be used to arrest the folding or unfolding sequence at any point.

Assuming now that both control valves are in the W position and the various tool bar sections 24 and 26 are in their extended horizontal but relatively flexible ground working position as shown in FIGS. 1 and 6, and that it is desired to fold the tool bar assembly 20 to the fully folded position in which it is shown in FIG. 3, first lift the implement by raising the 3 point hitch, then the manipulating handle 142 of the control valve CV1 will be shifted to its F position, whereupon hydraulic fluid will be withdrawn from the sump S by the pump P and flow through line 11, valve CV1, line 13, and branch lines 15 to the inner ends of the two cylinders 66 where, upon entering such cylinders through the ports 120 (FIG. 5) the free floating positive displacement pistons 114 will be shifted outwardly to the fullest extent of which they are capable and, at the same time, the pistons 118 and their associated plungers 119 will be shifted outwardly to a degree commensurate with the shifting of the pistons 114. This motion of the plungers 119 actuates the articulated linkage system associated with the offset hinge connections 30 as previously described in such a manner that the draw links 132 engage the abutment pins 134, thereby forcing the crank arms 126 to positions wherein the two outer tool bar sections 26 and 24 assume their 5° elevated positions. Fluid in the outer ends of the cylinders 66 will return to the sump S, through branch fluid lines 17, lines 19, 21, valve CV2, and line 23. The entire implement is then raised by the tractor three point hitch 33.

At this time, and with the control valve CV1 still remaining in its F position, the manipulating handle 144 of the control valve CV2 will be shifted to its folding position F, whereupon fluid will flow from the pump P through fluid line 31, valve CV2, line 29, and branch fluid lines 33 to the inner ends of the cylinders 64. Fluid will escape from the outer ends of the cylinders 64 through branch fluid lines 35, line 21, valve CV2, and line 23, back to the sump. This flow of fluid to and from the cylinders 64 will cause the plungers 84 to be extended thus effecting forward folding of the tool bar sections 24. It is to be noted at this point that a restriction orifice R1 (hereinafter referred to simply as a restrictor) is interposed in the fluid line 21, that a second restrictor R2 is interposed in the fluid line 29, and that a pair of restrictors R3 are interposed in the branch fluid lines 33. The function of these various restrictors will be made clear presently.

At the same time that a fluid path is established by the valve CV2 through the branch fluid lines 33 to the cylinders 64, as previously described, a fluid path is also established through the valve CV2 to the ports 122 (see FIG. 5) of the cylinders 66 for the purpose of fully projecting the plungers 119 and thereby folding the intermediate tool sections 26 upwardly. This latter fluid path extends from the pump P, through fluid line 31, control valve CV2, lines 29, 27, and branch fluid lines 25. Outward movement of the plungers 119 and their associated pistons forces fluid back to the sump S through lines 17, 19, 21, control valve CV2 and line 23.

Although, as described above, movement of the valve CV2 to its F position establishes fluid paths to both pairs of cylinders 64 and 66, the former cylinders 64 become effective to fold the outer tool bar sections 24 forwardly prior to the time that the cylinders 66 become effective to raise the tool bar sections 26 from their 5° positions of elevation to their fully folded positions. The reason for this is that the tool bar sections 26 and 24 being elevated above the ground have little resistance to folding. On the other hand, outward motion of the plungers 119 of the cylinders is opposed by considerable lifting torque and therefore the tendency for the fluid to follow the line of least resistance dictates that the cylinders 64 will become effective before the cylinders 66. The restrictors R1, R2 and R3 have very little if any effect on the flow of fluid to and from the cylinders 64 and 66 during tool bar folding operations.

In order to unfold the various tool bar sections 24 and 26 and thus restore them to their operative horizontal working positions, the manipulating handle 144 of the valve CV2 is shifted to the unfolding position U, while the handle 142 of the valve CV1 is left in its F position and, as a consequence, potential fluid paths leading from the pump P to the inner two-stage cylinders 66 and the outer single stage cylinders 64 are established. However, and as will be set forth in greater detail presently, the existence of the various restrictors R1, R2 and R3 will cause the cylinders 66 to become effective for tool bar unfolding operations to lower the intermediate tool bar sections 26 by swinging them about the horizontal axes of the offset hinge connections 30 before the cylinders 64 become effective to unfold the outer tool bar sections 24 horizontally about the vertical axes of the hinge connections 32.

Disregarding for the movement the function of the restrictors R1, R2 and R3, the path of hydraulic fluid to the two-stage cylinders 66 which obtains upon shifting of the control valve CV2 to its unfolding condition extends from the pump P, through the fluid line 31, control valve CV2, lines 21 and 19, and branch lines 17. The return fluid path from the cylinders 66 extends through branch lines 25, lines 27, 29, valve CV2 and line 23 back to the sump. The path of fluid to the outer cylinders 64 which obtains upon shifting of the valve CV2 to its U position extends from the pump P, through line 31, control valve CV2, line 21 and branch lines 35. The return line from the cylinders 64 extends through branch lines 33, line 29, valve CV2, and line 23 back to the sump.

In the case of the cylinders 66, since the restrictor R1 is interposed in the line 21 and the restrictor R2 is disposed in the line 29, fluid leading to the cylinders 66 is obliged to pass through the restrictor R1 while fluid leading from these cylinders 66 is obliged to pass through the restrictor R2. This exerts a dual dampening effect on the plungers 119 tending to retard its motion so that the speed of swinging movement of the intermediate tool bar sections 26 will be restrained. In the case of the cylinders 64, fluid leading to these cylinders is obliged to pass through the restrictor R1 while fluid leading from such cylinders is obliged to pass through the restrictors R3 which are interposed in the lines 33, and also through the restrictor R2 which is interposed in the line 29. Therefore a triple dampening effect is exerted on the plungers 84 of the cylinders 64. From the above description it will be apparent that because movement of the plungers 119 is opposed by only two restrictors while movement of the plungers 84 is opposed by three restrictors, hydraulic fluid, in following the line of least resistance will actuate the plungers 119 before it actuates the plungers 84 and therefore unfolding of the intermediate tool bar sections 26 vertically from the main tool bar section 22 will take place before unfolding the tool bar sections 24 horizontally from the intermediate tool bar sections.

It is to be noted at this point that because the control valve CV1 is left in its N position at the time the control valve CV2 is shifted to its unfolding condition U, lowering or unfolding of the intermediate sections will bring these sections down to their 5° elevated positions inasmuch as when the valve CV1 is in the N position the hydraulic fluid cannot pass through valve CV1 and maintains the free floating pistons 114 in their outermost positions. After the intermediate tool bar sections 26 become lowered to their 5° positions of elevation and the plungers 84 have become effective to unfold the forwardly folded outer tool bar sections 24, the manipulating handle 142 of the valve CV1 may be shifted to the working position W thereof, while at the same time the manipulating handle 144 of the valve CV2 may also be shifted to its working position W, thus relieving all fluid pressure either to or from all of the cylinders 66 and 64.

It is also to be noted at this point that during actuation of the cylinders 64 and 66, to effect tool bar folding and unfolding operations, fluid passes through the restrictors R1 and R2. The fluid dampening effect of these two restrictors is relied upon solely to prevent too rapid of movement of both the tool bar sections 26 and the tool bar sections 24. The restrictors R3 however are relied upon to effect actuation of the inner cylinders 66 before actuation of the outer cylinders 64 during unfolding operations as previously described.

From the above description it is believed that the nature and numerous advantages of the present articulated folding tool bar 20 and its associated adjuncts will be readily apparent without further discussion. The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an articulated sectional tractor drawn folding tool bar for carrying agricultural earth-working tools, in combination, a plurality of normally horizontal tool bar sections connected in substantially aligned end-to-end relationship for forward broadside movement in the direction of tractor travel and including a central main section, a pair of outer sections, and an intermediate section interposed between each outer section and the main section, an inner offset hinge joint having a horizontal hinge pin connecting each end of the main section to the inner end of the adjacent intermediate section for swinging movement of the latter section vertically between its normally lowered horizontal extended position and a raised folded position wherein it overlies the main section and extends at an angle of at least 90° relative thereto, an outer offset hinge joint having a vertical hinge pin connecting the outer end of each intermediate section to the inner end of the adjacent outer section for swinging movement of the latter section between its extended position and a forwardly folded position wherein it extends at least at an angle of 90° to such adjacent intermediate section, and a hydraulic cylinder and plunger arrangement for actuating each of said hinge joints, the hydraulic cylinder and plunger arrangement for actuating said inner hinge joints are of the two-stage type and are effective when the first stages thereof are actuated to swing and thus partially fold the associated intermediate sections vertically through a small angle to a slightly inclined position, and are effective when the second stages thereof are actuated to swing such intermediate sections vertically to their folded overlying positions, and a first hydraulic control means for sequentially actuating the outer cylinder and plunger arrangements for the outer hinge joints, and the second stages of the cylinder and plunger arrangements for inner hinge joints, successively and in the order named, a second hydraulic control means effective in a folding position to direct fluid under pressure to the cylinder and plunger arrangements for said inner hinge joints to actuate the first stages thereof to partially fold the intermediate tool bar sections and effective in a working position to relieve such fluid pressure and permit free floating, and wherein said first hydraulic control means is effective in a folding position to direct fluid under pressure to the cylinder and plunger arrangements for said outer hinge joints to actuate the same and effect forward folding of the outer tool bar sections and at the same time to direct fluid under pressure to the cylinder and plunger arrangements for said inner hinge joints to actuate the second stages thereof and effect swinging of said intermediate tool bar sections to their folded overlying positions, said first hydraulic control means being effective in an unfolding position to direct fluid under pressure to the cylinder and plunger arrangements for said inner hinge joints to actuate the same and effect return swinging movements of said intermediate tool bar sections to their extended positions and at the same time to direct fluid under pressure to the cylinder and plunger arrangements for the outer hinge joints to actuate the same and effect swinging movements of said outer tool bar sections to their extended positions, said first hydraulic control means being effective in a working position to relieve fluid pressure from all of the cylinder and plunger arrangements.

2. In an articulated sectional folding tool bar, the combination set forth in claim 1, wherein a fluid restrictor is interposed between said first hydraulic control means and the cylinder and plunger arrangement for each outer hinge joint and serves to retard the motion of the plunger of such arrangement to the end that fluid issuing from such control valve will be effectively transmitted to the cylinder and plunger arrangement for the adjacent inner hinge joint before it is effectively transmitted to the cylinder and plunger arrangement for said outer hinge joint when said control valve is in its unfolding position.

3. In an articulated sectional folding tool bar, the combination set forth in claim 2, wherein an additional restrictor is interposed between said first hydraulic control means and each of the cylinder and plunger arrangements and serves to retard the flow of fluid thereto from such valve.

* * * * *